United States Patent
Main et al.

(10) Patent No.: US 8,544,336 B2
(45) Date of Patent: Oct. 1, 2013

(54) SEALED CONDUCTIVE GRID CAPACITIVE PRESSURE SENSOR

(75) Inventors: Ian Main, Calgary (CA); David Jack, Calgary (CA)

(73) Assignee: Xsensor Technology Corporation, Calgary, Alberta (CA)

( * ) Notice: Subject to any disclaimer, the term of this patent is extended or adjusted under 35 U.S.C. 154(b) by 812 days.

(21) Appl. No.: 12/626,661

(22) Filed: Nov. 26, 2009

(65) Prior Publication Data

US 2011/0120228 A1    May 26, 2011

(51) Int. Cl.
*G01L 9/12*   (2006.01)

(52) U.S. Cl.
USPC .............................................. 73/724; 73/715

(58) Field of Classification Search
None
See application file for complete search history.

(56) References Cited

U.S. PATENT DOCUMENTS

| | | | |
|---|---|---|---|
| 3,678,378 A * | 7/1972 | Trott et al. ................. 177/210 C |
| 4,175,445 A * | 11/1979 | Templeton, III ................. 73/768 |
| 4,179,627 A * | 12/1979 | Reitz ............................. 327/100 |
| 4,584,625 A * | 4/1986 | Kellogg ....................... 361/283.1 |
| 4,644,801 A * | 2/1987 | Kustanovich ............ 73/862.046 |
| 5,010,772 A * | 4/1991 | Bourland et al. ........ 73/862.046 |
| 5,479,827 A * | 1/1996 | Kimura et al. .................. 73/718 |
| 6,225,190 B1 * | 5/2001 | Bruel et al. ..................... 438/458 |
| 6,438,257 B1 * | 8/2002 | Morimura et al. ............. 382/124 |
| 6,518,083 B2 * | 2/2003 | Sato et al. ......................... 438/50 |
| 6,727,561 B2 * | 4/2004 | Sato et al. ...................... 257/414 |
| 6,826,968 B2 * | 12/2004 | Manaresi et al. ........ 73/862.046 |
| 6,999,301 B1 * | 2/2006 | Sanftleben et al. ........... 361/312 |
| 7,069,791 B2 * | 7/2006 | Hashimoto et al. ............. 73/780 |
| 7,181,975 B1 * | 2/2007 | Bradley et al. .................. 73/724 |
| 7,205,621 B2 * | 4/2007 | Sato et al. ...................... 257/415 |
| 7,360,293 B2 * | 4/2008 | Sato et al. ........................ 29/595 |
| 7,673,528 B2 * | 3/2010 | Yoon et al. ............... 73/862.041 |

* cited by examiner

*Primary Examiner* — Lisa Caputo
*Assistant Examiner* — Jermaine Jenkins
(74) *Attorney, Agent, or Firm* — Bennett Jones LLP

(57) ABSTRACT

A capacitive pressure sensor array is made of two conductive layers, wherein each conductive layer is formed with a plurality of elongated conductors disposed in a substantially parallel manner between an upper and a lower insulating sheet, wherein the upper and lower insulating sheets are bonded to each other between adjacent conductors.

14 Claims, 4 Drawing Sheets

SEALED CONDUCTIVE GRID CAPACITIVE PRESSURE SENSOR

FIELD OF THE INVENTION

This invention related to a capacitive pressure sensor having improved properties.

BACKGROUND

Capacitive pressure sensors use the property of capacitance to measure pressure. A capacitor is comprised of two isolated parallel conductive surfaces that are separated by a non-conductive dielectric material. Changes in the distance between the electrically charged conductive surfaces in turn change the capacitance.

Capacitive sensors incorporated in pressure mapping systems allow measurement of interface pressure between two surfaces. A pressure mapping system typically incorporates a matrix of capacitors in which thin, electrically isolated conductors are separated by a compressible, dielectric material. When pressure is applied to the capacitor, the distance between the conductors is reduced, resulting in a change in capacitance. The detected capacitance may be correlated to a pressure value. The individual pressure values for each capacitive element are then processed to create a two dimensional map of the pressure distribution. Each cell acts as an ideal plate capacitor and is not subject to change in area or influenced by other capacitors in the array.

Ideally, the two surfaces between which the sensor is placed should be flat or uniform. However, there are often circumstances where it is desirable to measure the pressure distribution on uneven or undulating surfaces. Examples include measuring the interface pressures between a person and their mattress surface, or their seating surface. In clinical environments, this information is used to optimize patient comfort, and ensure that the pressure levels are acceptable over time as to not cause tissue damage or necrosis. The sensor must conform to the two surfaces which it contacts to avoid providing inaccurate data to the pressure mapping system.

Current techniques for producing capacitive sensors involve bonding a thin elastomer to parallel strips of conductive fabric using non-conductive adhesives to hold the conductive strips in position and to isolate them electrically from neighbouring strips. This configuration prevents short circuits and provides geometric stability, as shown in prior art FIG. 1. Two layers of these elastomer/conductor combinations are required, where each intersection of conductors forms a sensel. However, a capacitive sensor formed using this technique has a thickness which adversely affects the suppleness of the final product, reducing the ability of the sensor to conform to surfaces and impacting image quality.

Adhesives are geometrically unstable, deforming upon application of pressure or heat. Upon removal of the pressure or heat, adhesives often create artifacts such as the appearance of pressure after the pressure has been removed. These "ghost" images can contribute to inaccurate pressure values. Adhesives which are less susceptible to deformation result in a lamination that is less pliable when assembled into a sensor. Ideally, the only part of a sensor which should deform is the dielectric which acts as a spring in between the capacitive plates.

SUMMARY OF THE INVENTION

The present invention relates to a capacitive pressure sensor having improved properties.

In one aspect, the invention comprises a capacitive pressure sensor array comprising two conductive layers, wherein each conductive layer comprises a plurality of elongated conductors disposed in a substantially parallel manner between an upper and a lower insulating sheet, wherein the upper and lower insulating sheets are bonded to each other between adjacent conductors.

In another aspect, the invention comprises a capacitive pressure sensor array comprising two conductive layers, wherein each conductive layer comprises a plurality of parallel elongated sleeves formed between an upper and a lower insulating sheet by bonding the upper and lower insulating sheets together, and a plurality of elongated conductors disposed within the sleeves.

Additional aspects and advantages of the present invention will be apparent in view of the description which follows. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings.

FIG. 4 is an exploded view of two conductive layers of a capacitive sensor array with dielectric material in between.

DETAILED DESCRIPTION OF PREFERRED EMBODIMENTS

When describing the present invention, all terms not defined herein have their common art-recognized meanings. To the extent that the following description is of a specific embodiment or a particular use of the invention, it is intended to be illustration only, and not limiting of the claimed invention. The following description is intended to cover all alternatives, modifications and equivalents that are included in the spirit and scope of the invention, as defined in the appended claims.

To facilitated understanding of the invention, the following definitions are provided:

(a) "Capacitance" means a property of a system of conductors and dielectric which permits the storage of electricity when potential difference exists between the conductors. Its value is expressed as the ratio of a quality of electricity to a potential difference. A capacitance value is always positive. The charge which must be communicated to the body to raise its potential one unit is represented by $C=Q/V$, where C is the capacitance, Q is the quantity of charge, and V is the potential.

(b) "Dielectric" means a material which does not allow current to flow and supports an electric field under the presence of a potential difference.

(c) "Flexible" means pliable and capable of being substantially bent through its thinnest dimension and returning to a flat configuration.
(d) "Grid" means each conductive layer can contain multiple conductive elements which are physically and electrically isolated from each other.
(e) "Elastomer" means a polymer, for example but not limited to urethane, that has some degree of elasticity. An elastomer may be a dielectric material but its dielectric properties do not significantly affect the capacitance of the sensing elements.

The present invention relates to a capacitive sensor having improved properties. The flexibility of a capacitive sensor can be modelled using the deflection formula (1) for a beam:

$$Y_{max} = \frac{PL^3}{48EI} \qquad (1)$$

Where: $Y_{max}$=maximum deflection;
P=load;
L=distance between centers;
I=second moment of area; and
E=modulus of elasticity.

I (the second moment of area) is shape-dependent and expressed by formula (2) in respect of a rectangular shape:

$$L = \frac{bh^3}{12} \qquad (2)$$

Where: h=height;
L=length; and
b=width.

The height or thickness of a beam has a dramatic effect on deflection. If a beam of equal length, loading and modulus of elasticity is half as thick, the deflection at center increases eightfold. In view of the above, one skilled in the art would appreciate that a capacitive sensor should be as thin as possible to enhance the overall flexibility of the sensor.

Figure 1:
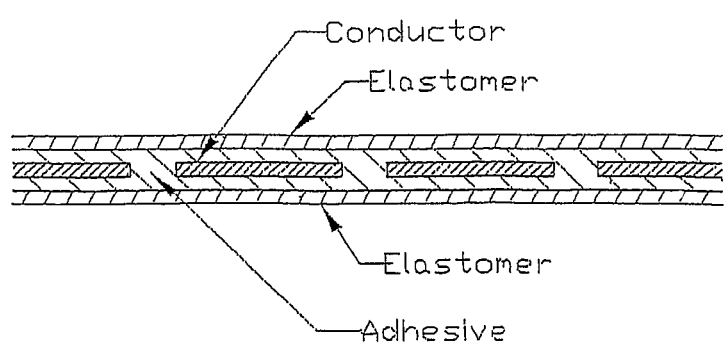
FIG. 1 is a schematic diagram showing a sectional view of a prior art capacitive sensor using adhesive lamination.
Figure 2:
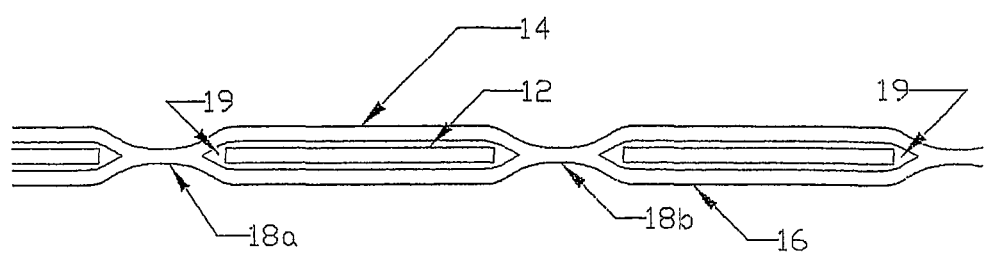
FIG. 2 is a schematic diagram showing a section view of one embodiment of a sealed conductive grid of the present invention.

In one embodiment, one layer of a capacitive sensor (10) comprises an elongated conductor (12) encapsulated between an upper insulating layer (14) and a lower insulating layer (16) as shown in FIG. 2. The upper insulating layer (14) and lower insulating layer (16) are bonded to form seals (18a, 18b) between adjacent conductors (12). In other words, the two insulating layers form a plurality of elongated parallel pockets (19), within which the conductors (12) are disposed.

The insulating layer is formed of a non-conducting material, and is preferably thin, flexible and elastic. Many polymers are suitable, and in one embodiment, an elastomer is preferred.

Figure 4:
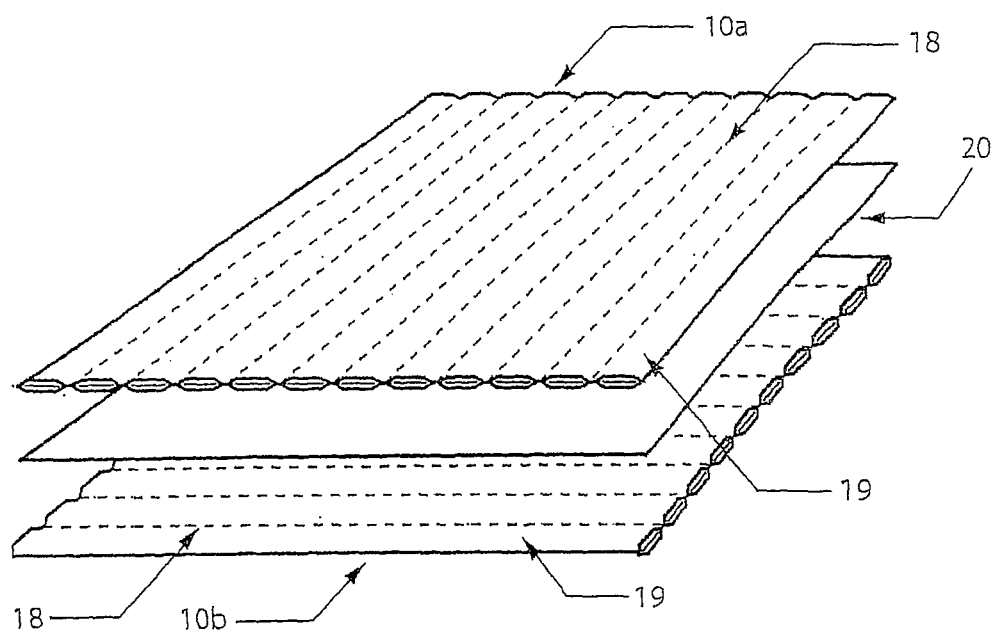

A two-dimensional capacitive grid is formed by layering two conductive layers (10a, 10b) as illustrated in FIG. 4, where the elongated conductors (12) within the pockets (19) are at substantially right angles to each other. A compressible dielectric material (20) separates the two conductive layers.

The conductors (12) may be any material suitable for use in a capacitive pressure sensor, which are well known to those skilled in the art. For example, the conductors may be formed of a conductive plastic, conventional thermoset or thermoplastic material loaded with a conductive filler or having a thin conductive coating, or a metalized fabric.

Figure 3:
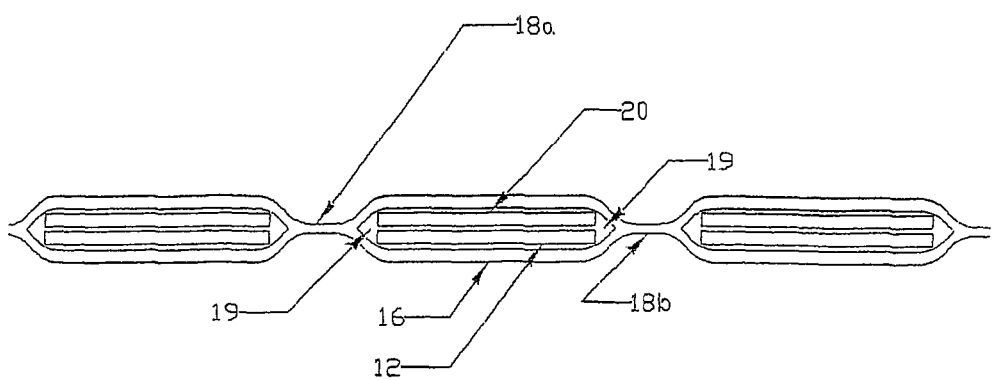
FIG. 3 is a schematic diagram showing a sectional view of one embodiment of a capacitive sensor including a dielectric layer embedded in the sealed conductive grid.

In one embodiment, the capacitive sensor (10) comprises a conductor (12) and a dielectric strip (20) encapsulated between an upper insulating layer (14) and a lower insulating layer (16) as shown in FIG. 3. If the dielectric is provided within the insulating layers, then a dielectric sheet (20) is not required between the two conductive layers (10a, 10b). The upper insulating layer (14) and lower insulating layer (16) are bonded to form seals (18a, 18b) between adjacent conductors (12) and dielectric strips (20). In one embodiment, the dielectric strip (20) is positioned above the conductor (12). In one embodiment, the dielectric strip (20) has substantially the same dimensions as the conductor (12).

The seals (18) between upper and lower insulating layers (14, 16) may be formed by any suitable method, such as by the use of adhesives, solvent chemical bonding, heat bonding such as impulse heat sealing or RF welding, or ultrasonic bonding. It is not required that the seal be a hermetic seal or fluid-tight. It is only required that the seal creates a physical barrier to lateral movement of the conductors (12) and maintains them in their parallel configuration.

In one embodiment, the capacitive sensor (10) layer may be formed by tacking a conductor (12) to a single sheet of insulating material and then sealing to untacked insulating. A tacked bond is a non-structural bond which may be used for assembly during manufacturing or to temporarily place an element. For example, the conductor may be tacked to an insulating sheet using small amounts or dots of adhesive. The amount of adhesive used is preferably only sufficient to ensure the conductor stays in place while the assembly of the upper and lower insulating sheets and sealing between conductors takes place.

The conductor (12) may be formed of any suitable material known in the art including, but not limited to, intrinsically conductive plastics, conventional thermosetting or thermoplastics loaded with conductive filler, metalized fabrics, and thermosetting or thermoplastics having a thin conductive coating.

The capacitive sensors (10) of the present invention have a reduced cross-sectional thickness compared to prior art sensors. The layers within the sensor are free to slide past each other on one or more planes. The capacitive sensors (10) may be considered as comprising several thinner beams rather than a single beam. The resistance to bending is thus considerably reduced. Normally, doubling the height of a beam results in an eight-fold increase in stiffness. However, using two beams which are free to slide past each other, only doubles the stiffness as compared to a single beam.

As will be apparent to those skilled in the art, various modifications, adaptations and variations of the forgoing specific disclose can be made without departing from the scope of the invention claimed herein.

What is claimed is:

1. A capacitive pressure sensor array comprising a sealed conductive grid, said grid comprising two conductive layers, wherein each conductive layer comprises:
   (a) a flexible upper insulating sheet;
   (a) a flexible lower insulating sheet;
   (a) a plurality of elongated conductors disposed in a substantially parallel manner between the upper and the lower insulating sheet; and
   wherein the upper and lower insulating sheets are directly bonded to each other between adjacent conductors.

2. The sensor array of claim 1 wherein the conductors are not bonded to one of the upper and lower insulating sheets.

3. The sensor array of claim 2 wherein the conductors are not bonded to either of the upper and lower insulating sheets.

4. The sensor array of claim 1, 2 or 3 wherein the upper and lower insulating sheets are bonded to each other by a heat or other bonding technique.

5. The sensor array of claim 1 further comprising a plurality of dielectric strips, wherein each dielectric strip is disposed between a conductor of one conductive layer and a conductor of the other conductive layer, or between the upper and lower insulating sheets of one conductive layer, and is not bonded to the conductor or either insulating sheet.

6. The sensor array of claim 1 further comprising a compressible dielectric sheet between the two conductive layers.

7. The sensor array of claim 1, 2, 3, 5, or 6 wherein the insulating sheets are comprised of an elastomer.

8. A capacitive pressure sensor array comprising a sealed conductive grid comprising two conductive layers, wherein each conductive layer comprises:
   (a) a flexible upper insulating sheet;
   (a) a flexible lower insulating sheet;
   (a) a plurality of elongated conductors;
   wherein the upper and lower insulating sheets are bonded together to form a plurality of parallel elongated sleeves and the conductors are disposed within the sleeves.

9. The sensor array of claim 8 further comprising a plurality of dielectric strips, wherein each dielectric strip is disposed between a conductor of one conductive layer and a conductor of the other conductive layer, or between the upper and lower insulating sheets of one conductive layer, and is not bonded to the conductor or either insulating sheet.

10. The sensor array of claim 8 further comprising a dielectric sheet between the two conductive layers.

11. The sensor array of claim 8, 9 or 10 wherein the insulating sheet is comprised of an elastomer.

12. The sensor array of claim 8 wherein the upper and lower insulating sheets are comprised of an elastomer and are bonded to each other by a heat or other bonding technique.

13. The sensor array of claim 1 or 8 wherein the parallel direction of the elongated conductors of one conductive layer and the parallel direction of the elongated conductors of the other conductive layer are disposed at an angle to each other.

14. The sensor array of claim 13 wherein the angle is about 90 degrees.

* * * * *